(12) United States Patent
Sonogi

(10) Patent No.: US 8,705,132 B2
(45) Date of Patent: Apr. 22, 2014

(54) PRINTING APPARATUS, DATA PROCESSING METHOD FOR PRINTING APPARATUS AND STORAGE MEDIUM

(75) Inventor: Katsutoshi Sonogi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 13/466,932

(22) Filed: May 8, 2012

(65) Prior Publication Data

US 2012/0287476 A1    Nov. 15, 2012

(30) Foreign Application Priority Data

May 12, 2011    (JP) ................................. 2011-107010

(51) Int. Cl.
- *H04N 1/40* (2006.01)
- *G06K 15/02* (2006.01)
- *G06F 3/12* (2006.01)
- *G06K 15/00* (2006.01)
- *G03G 15/08* (2006.01)
- *G03G 15/20* (2006.01)

(52) U.S. Cl.
USPC ......... 358/3.01; 358/1.1; 358/1.15; 358/1.16; 358/1.17; 358/1.9; 399/29; 399/68; 399/341

(58) Field of Classification Search
USPC ............... 358/3.01, 1.1, 1.15, 1.16, 1.17, 1.9; 399/29, 68, 341
See application file for complete search history.

(56) References Cited

U.S. PATENT DOCUMENTS

| | | | | |
|---|---|---|---|---|
| 6,124,943 | A * | 9/2000 | Mitani | 358/1.17 |
| 8,254,796 | B2 * | 8/2012 | Oyoshi | 399/29 |
| 8,508,799 | B2 * | 8/2013 | Ito | 358/1.9 |
| 2010/0195149 | A1 * | 8/2010 | Kashimoto | 358/1.15 |

FOREIGN PATENT DOCUMENTS

JP    09-218861 A    8/1997

* cited by examiner

*Primary Examiner* — Charlotte M Baker
(74) *Attorney, Agent, or Firm* — Canon U.S.A., Inc., IP Division

(57) ABSTRACT

A printing apparatus and method for processing data in the printing apparatus includes estimating a printing time by adding an intermediate data generation time and a rendering time, determining whether the estimated printing time of each page keeps up with a timing at which an image needs to be formed on a conveyed sheet for each page. If it is determined that the estimated printing time does not keep up with the timing at which the image needs to be formed, further determining whether an idle time is present by comparing the intermediate data generation time and the rendering time. If it is discriminated that the idle time is present, the changing an optimization level for determining whether to perform processing on a particular object in the document image data during rendering, or to perform the processing during intermediate data generation.

9 Claims, 11 Drawing Sheets

PRINTING APPARATUS, DATA PROCESSING METHOD FOR PRINTING APPARATUS AND STORAGE MEDIUM

BACKGROUND OF THE INVENTION

1. Field of the Invention

The present invention relates to a printing apparatus capable of processing document image data received from the outside and stored, a data processing method for the printing apparatus and a storage medium.

2. Description of the Related Art

A printing apparatus temporarily stores data before printed in a memory as document image data. While in this state, the document image data is generated from information of a print job. The format of the document image data is the one internationally standardized based on specifications of portable document format (PDF) data. The printing apparatus generates intermediate data from the document image data, performs rendering processing on the intermediate data, and outputs an image. An intermediate data generation time and a rendering time can be estimated from the details, a number of pages, and the like of the document image data stored in the memory.

There is an issue that when intermediate data for printing is generated from the document image data stored in advance in the memory, a printing time does not keep up with an engine speed depending on a job. The printing time is a value obtained by adding the intermediate data generation time and the rendering time. As a solution, there is such a method for changing the intermediate data to adjust the rendering time, when the printing time cannot keep up with the engine speed at respective pages.

Japanese Patent Application Laid-Open No. 09-218861 discusses a method for measuring an intermediate data generation time and a rendering time of print data and improving the rendering time by changing the intermediate data, when the measured data has similar tendency to the past data which took long printing time. In this method, since the printing method is changed based on the past data, the tendency for the data which has never been handled is not understood, and accordingly countermeasures cannot be taken.

When the above-described document image data is used in the printing apparatus, the data can be managed for each item of objects. In other words, the document image data can be used as higher level data of conventional intermediate data. By using the document image data in this manner, even data which conventionally takes long processing time for printing can be changed.

There are several methods for optimizing the document image data. The optimization method can change the rendering time by changing contents of the intermediate data for each level. The rendering time of a job including a plurality of pages which has never been processed in the past can be improved with use of the optimization level.

However, if the rendering time becomes fast by processing the document image data as described above, an idle time is generated from a difference between the intermediate data generation time and the rendering time. There is an issue that in a case where such an idle time is generated and if the rendering time is not adjusted to keep up with a timing at which image formation is performed on a conveyed sheet by the printing apparatus, processing waiting for being performed occurs during the intermediate data generation or during the rendering and printing time is delayed.

SUMMARY OF THE INVENTION

An aspect of the present invention relates to a mechanism capable of improving a print processing time of an entire job by shortening an idle time which is generated in rendering processing between respective pages on stored document image data.

According to an aspect of the present invention, a printing apparatus that forms an image generated by analyzing document image data including a plurality of pages on a conveyed sheet includes an estimation unit configured to analyze document image data of each page and estimate a printing time of each page by adding an intermediate data generation time for generating intermediate data and a rendering time for rendering the generated intermediate data, a determination unit configured to determine whether the printing time of each page estimated by the estimation unit keeps up with a timing at which an image needs to be formed on a sheet conveyed for each page, a discrimination unit configured to, if it is determined that the printing time does not keep up with the timing at which the image needs to be formed, determine whether an idle time for pausing rendering between pages is present by comparing the intermediate data generation time and the rendering time, and a changing unit configured to, if it is determined that the idle time is present, change an optimization level for determining whether to perform processing on a particular object in the document image data during rendering or to perform the processing during intermediate data generation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<Descriptions of System Configuration>

Figure 1:
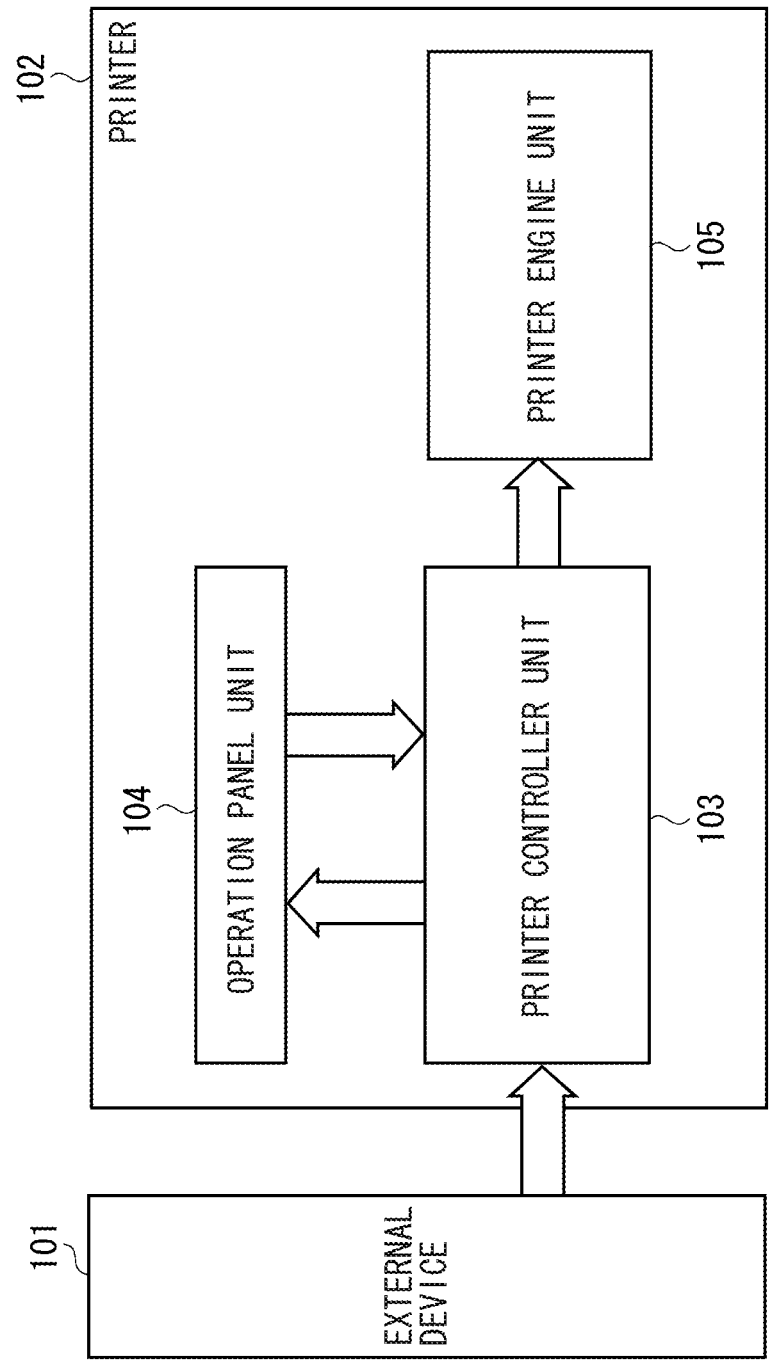
FIG. 1 is a block diagram illustrating a configuration of a printing apparatus.

FIG. 1 is a block diagram illustrating a configuration of a printing apparatus according to an exemplary embodiment of the present invention. FIG. 1 illustrates an example of a print system example in which an external device 101 and a printer (printing apparatus) 102 can communicate with each other via a bidirectional communication interface such as a network. The printing apparatus according to the present exemplary embodiment includes a storage device which stores document image data received from the external device 101 and performs rendering processing on the stored document image data.

In FIG. 1, the printing apparatus includes a printer controller unit 103, a printer engine unit 105, and an operation panel unit 104. The printer controller unit 103 receives code data (various types of page description languages (PDLs)) which is input from the external device 101 such as a host computer (hereinafter, a host). A central processing unit (CPU) of the printer controller unit 103 generates image data (page information) by analyzing the code data. The generated image data is transmitted to the printer engine unit 105 via an interface.

The printer engine unit 105 forms an image represented by the image data generated by the printer controller unit 103 on a sheet with use of an electrophotographic process. The printer engine unit 105 includes various mechanisms and an engine control unit that controls respective print processing (e.g., sheet feed processing) performed by the various mechanisms. The operation panel unit 104 controls an interface with a user and constitutes an operation unit for performing input operation to instruct the printer 102 to perform operations desired by the user.

Figure 2:
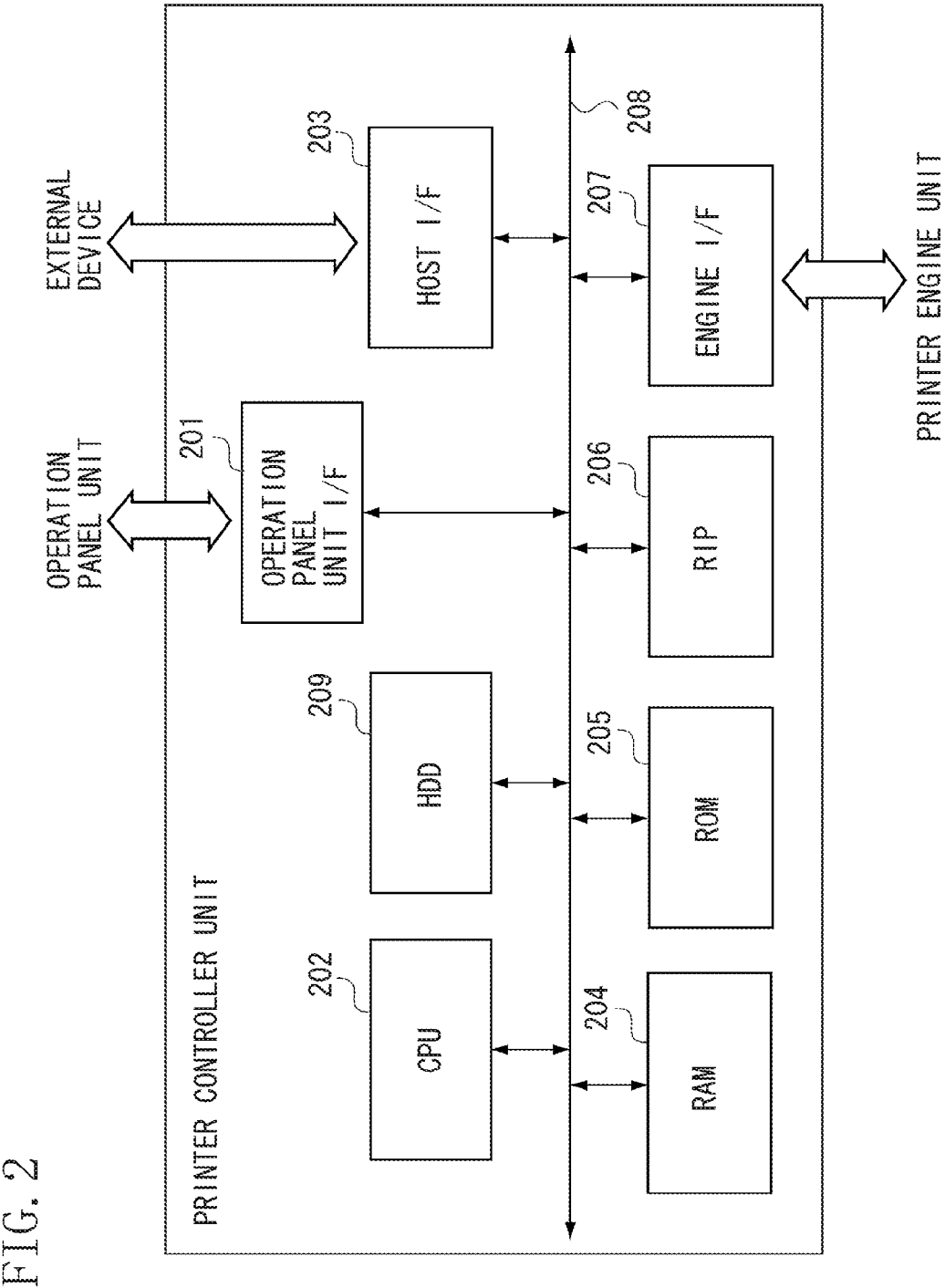
FIG. 2 is a block diagram illustrating a configuration of a printer controller unit.

Next, a configuration of the printer controller unit 103 is described below referring to FIG. 2. FIG. 2 is a block diagram illustrating the configuration of the printer controller unit 103 illustrated in FIG. 1. In FIG. 2, a CPU 202 controls the entire printer controller unit 103. A host interface (host I/F) 203 performs communication control between the printer controller unit 103 and the external device 101.

A raster image processor (RIP) 206 renders the PDL data or the like, which is received from the external device 101, into bitmap data using a random access memory (RAM) 204. The CPU 202 creates, from the code data input from the external device 101 via the host I/F 203, the bitmap data which can be processed by the printer engine unit 105 from the RIP 206 in accordance with a control code stored in a read only memory (ROM) 205.

The thus created bitmap data is transferred to the printer engine unit 105 as a video signal via an engine I/F unit 207. The engine I/F unit 207 serves an input/output unit of a signal exchanged with the printer engine unit 105 and performs communication control between the printer engine unit 105 and itself.

An instruction relating to a mode setting issued by an operation input from the operation panel unit 104 (illustrated in FIG. 1) is input via an operation panel unit I/F 201. The operation panel unit I/F 201 is an interface between the operation panel unit 104 and the CPU 202.

The CPU 202 performs control over the respective blocks described above according to a mode instructed from the operation panel unit 104, and this control is executed based on the control code stored in the ROM 205. The respective blocks including the CPU 202 described above are connected to a system bus 208 so that the CPU 202 can access to the respective blocks. A hard disk drive (HDD) 209 stores therein system software for various types of processing, input image data, and the like.

Figure 3:
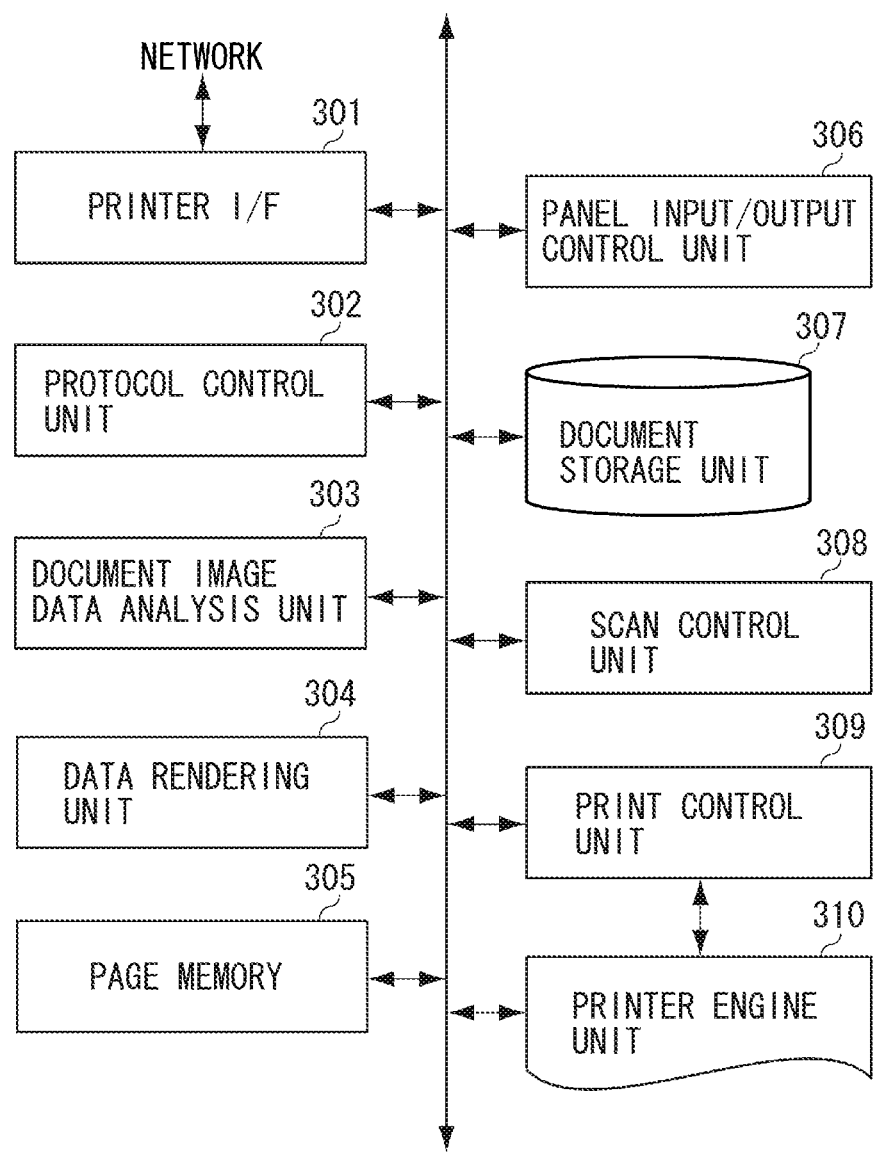
FIG. 3 is a block diagram illustrating a configuration of software for controlling an operation of the printing apparatus.

FIG. 3 is a block diagram illustrating a configuration of controller software which controls an operation of the printing apparatus illustrated in FIG. 1. In FIG. 3, a printer interface 301 is an input/output unit to the outside. A protocol control unit 302 performs communication with the outside by analyzing and transmitting a network protocol.

A document image data analysis unit 303 analyzes document image data such as the PDL, and estimates a printing time (intermediate data generation time+rendering time). Further, the document image data analysis unit 303 determines an optimization of the document image data from a result of the time estimation. The optimized document image data is converted into intermediate description data (intermediate data 401) in a format that is more easily processed.

The intermediate code generated by the document image data analysis unit 303 is transferred to a data rendering unit 304 and processed there. The data rendering unit 304 is used to render the above-described intermediate code into the bitmap data, and the rendered bitmap data is sequentially rendered into a page memory 305. The page memory 305 is a volatile memory that temporarily stores the bitmap data which is rendered by a renderer.

A panel input/output control unit 306 is used to control input and output from/to the operation panel unit 104. The panel input/output control unit 306 displays a preview image of the bitmap data generated for a preview in the page memory 305 on the operation panel unit 104. The panel input/output control unit 306 sequentially displays the bitmap data which is rendered in the page memory 305 on the operation panel unit 104, each time the preview image is updated.

A document storage unit 307 stores the document image data by the blocks (jobs) of an input document, and is realized by a secondary storage device such as a hard disk. A scan control unit 308 performs various types of processing such as correction, modification, and edition, on the image data input from a scanner (not illustrated).

A print control unit 309 converts contents of the page memory 305 into a video signal, and transfers an image to a printer engine unit 310. The printer engine unit 310 is a printing mechanism unit which performs permanent visualization and image formation of the received video signal on recording paper.

Figure 4:
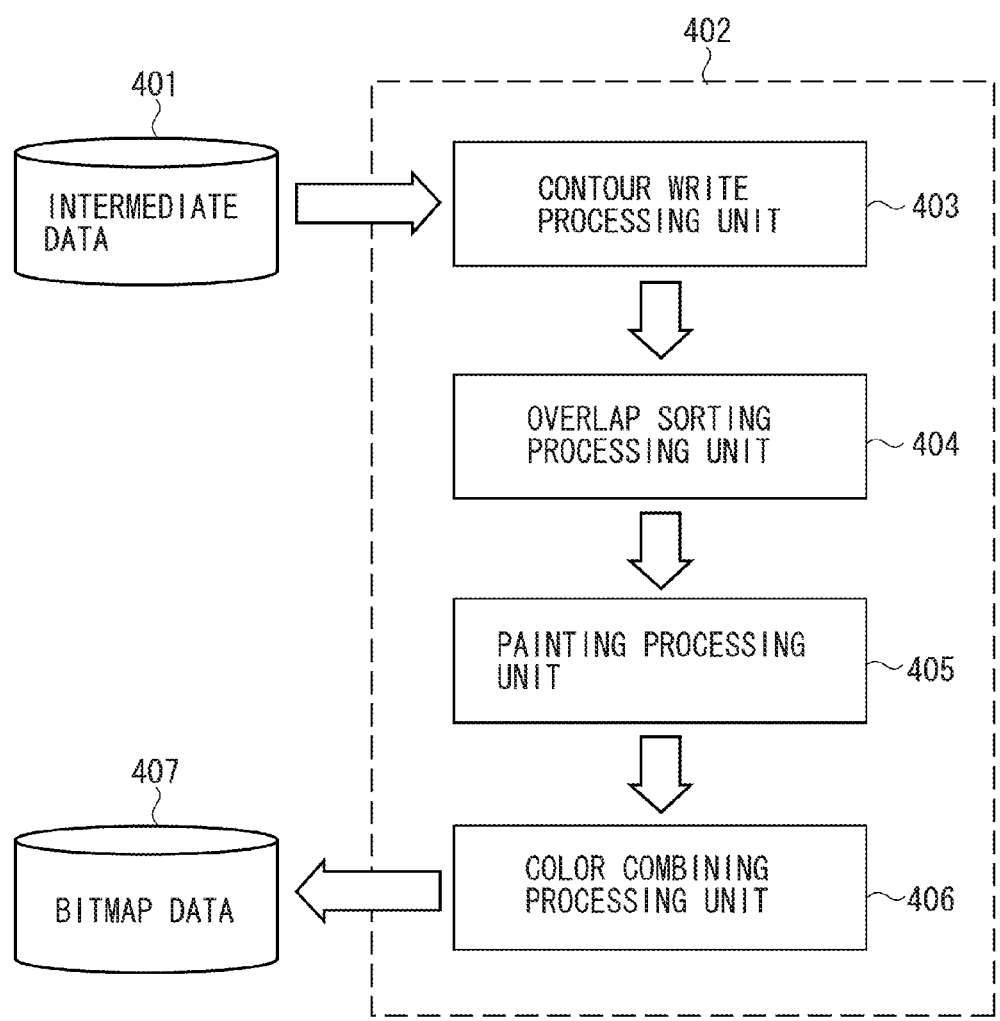
FIG. 4 is a block diagram illustrating a configuration of a scan line renderer of a data rendering unit.

FIG. 4 is block diagram illustrating a configuration of a scan line renderer 402 in the data rendering unit 304 illustrated in FIG. 3. In FIG. 4, intermediate data 401 is intermediate code obtained by converting the document image data by the document image data analysis unit 303. The scan line renderer 402 receives the intermediate data 401 as input data, and generates bitmap data 407 via processing in a contour write processing unit 403, an overlap sorting processing unit 404, a painting processing unit 405, and a color combining processing unit 406. The bitmap data 407 is stored in the page memory 305 illustrated in FIG. 3.

The contour write processing unit 403 performs processing for acquiring contour information from a rendering object included in the intermediate data 401. The contour information refers to two pieces of information, a starting point position of a contour of the rendering object and a contour width. When the contour information acquired by the contour write processing unit 403 equivalent to one scan line of the image data is gathered, information of contour coordinates is transmitted to the following overlap sorting processing unit 404.

The overlap sorting processing unit 404 performs sorting so that the rendering objects are aligned in a correct order with respect to a paper surface based on the information of the contour coordinates and an above-and-below relationship between overlapped rendering objects. Sorted contour information is transmitted to the painting processing unit 405 after the information equivalent to one scan line of the image data is gathered.

The painting processing unit 405 adds color information to every single segment which is segmented by the contours with respect to the sorted contour information. A gradation pattern used in the present exemplary embodiment is generated by the painting processing unit 405. When the information equivalent to one scan line is gathered, the sorted contour information to which the color information generated by the painting processing unit 405 is added is transmitted to the color combining processing unit 406.

The color combining processing unit 406 applies an overlap rule according to the intermediate data 401 to portions which are regions segmented by the contours based on the sorted contour information added with the color information and overlap with regions segmented by other contours among the segmented regions. The overlap rule includes Raster OPerator (ROP) and an alpha blend.

The ROP is a logical operation performed among bits which represent color values of a front surface side and a back surface side on portions where the regions are overlapped one above another. When the ROP is specified as the overlap rule, a result of the logical operation performed between color values which represent the regions on the front surface side and the back surface side is output. The alpha blend is used to specify ratios of the both sides to overlapped portions among the regions segmented by contours, when colors on the front surface side and the back surface side of the both portions are mixed and output.

The color combining processing unit 406 determines what color to be output from the regions on the front surface and the back surface of the overlapped regions by applying the overlay rule. Regarding the data generated by the color combining processing unit 406, the bitmap data 407 is output as color information for each one pixel of the image data.

Figure 5:
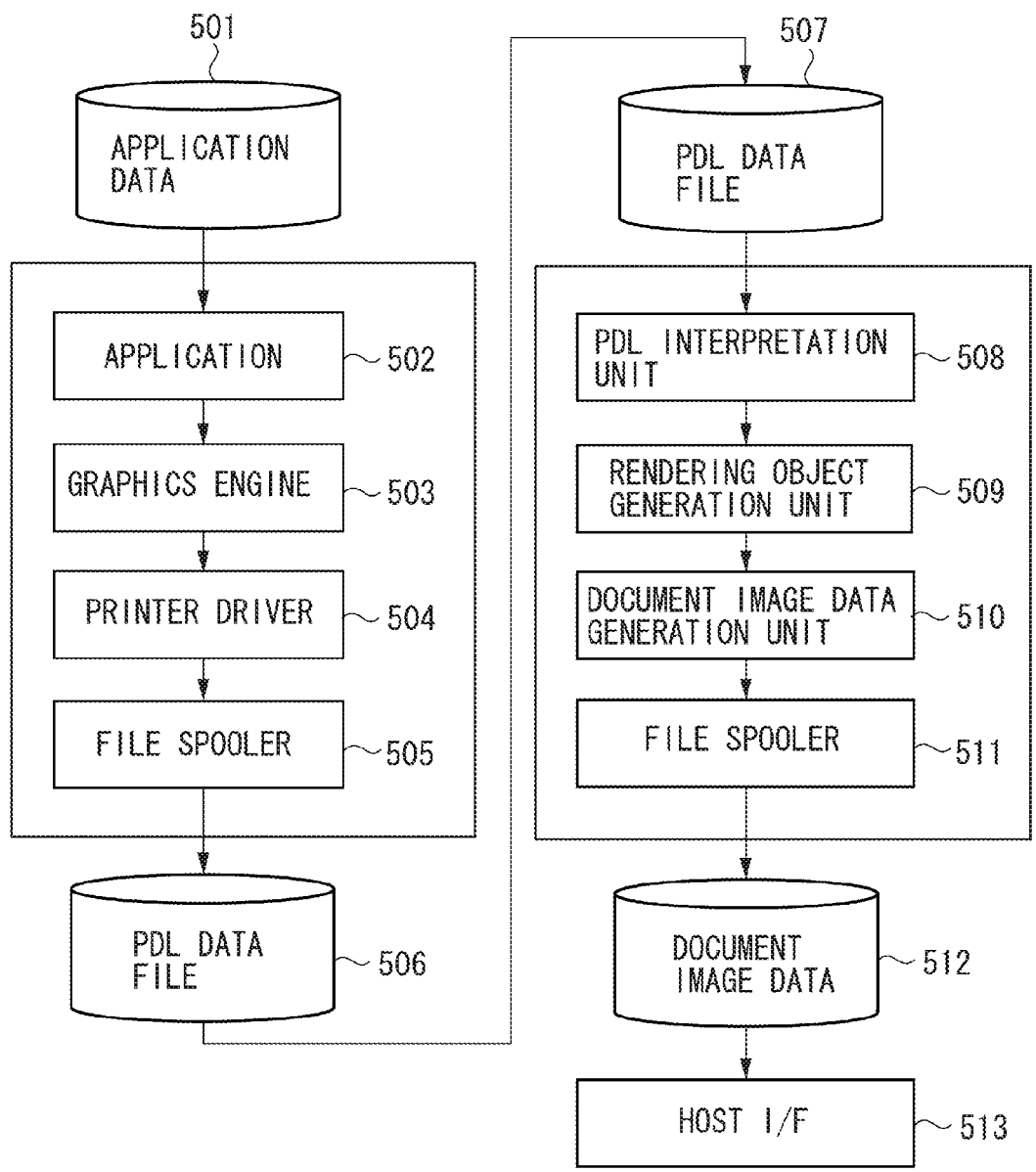
FIG. 5 illustrates a flow of data processing of an external device.

FIG. 5 illustrates a flow of data processing of the external device 101 illustrated in FIG. 1. FIG. 5 illustrates an example of a configuration of a program for generating electronic image data operated in the external device 101 and a procedure of data generation. The configuration of the program for generating document image data, which operates on the external device 101 such as a host computer, and a procedure for data generation will be described below with reference to FIG. 5.

First, a basic internal configuration of the external device 101 will be described. The external device 101 includes, as hardware, a CPU, a RAM, a ROM, an HDD, input devices such as a keyboard and a mouse, an output device such as a display, a network I/F, and a chipset to control these devices. These devices are connected to one another by an internal data bus. As software to control these devices of hardware, a basic input/output system (BIOS) and an operating system (OS) operate.

Application data 501 is stored in the RAM or the HDD, loaded by an application 502, and edited as needed. The application 502 is software (a program) for a word processor, spreadsheet, graphics processing, photograph image processing, and so forth.

A graphics engine 503 performs rendering conversion processing for display output or print out of a processing result of the application 502. A printer driver 504 receives rendering data from the graphics engine 503, and converts the rendering data into page description language (PDL) data which the printing apparatus can interpret. In this case, a language such as LIPS LX (trademark) or UFR (trademark) is used for the PDL. A file spooler 505 temporarily accumulates PDL data which is converted and output as needed by the printer driver 504, and stores the output PDL data as a PDL data file 506. The processing so far is a general PDL data generation procedure existing before the present invention is disclosed.

A PDL data file 507 is the same as the PDL data file 506. A PDL interpretation unit 508 interprets the PDL data file 506. Then, a rendering object generation unit 509 generates a plurality of rendering objects suitable for printing in order suitable for printing. In this case, the rendering objects are brought together for each page and are aligned in order of page numbers starting from a first page to the last page. The rendering objects included in one page are aligned in consideration of the overlap therebetween. The rendering objects which are covered by the overlap are aligned in front, and the rendering objects which cover the previously described objects by the overlap are aligned in back.

A document image data generation unit 510 receives the rendering objects in order from the rendering object generation unit 509, and converts the rendering objects into a specified document image data format. A file spooler 511 temporarily accumulates the document image data which is converted and output as needed by the document image data generation unit 510, and stores it as document image data 512. Further, the document image data is transferred to other devices connected to the network via a host I/F 513, as needed.

An internal data structure of the document image data will be described below with reference to FIG. 6. Unless otherwise specified, a grammar similar to electronic document file format defined in the standard by the International Organization for Standardization as ISO32000-1 is applied to a document image data file to be handled in the present invention.

Figure 6:
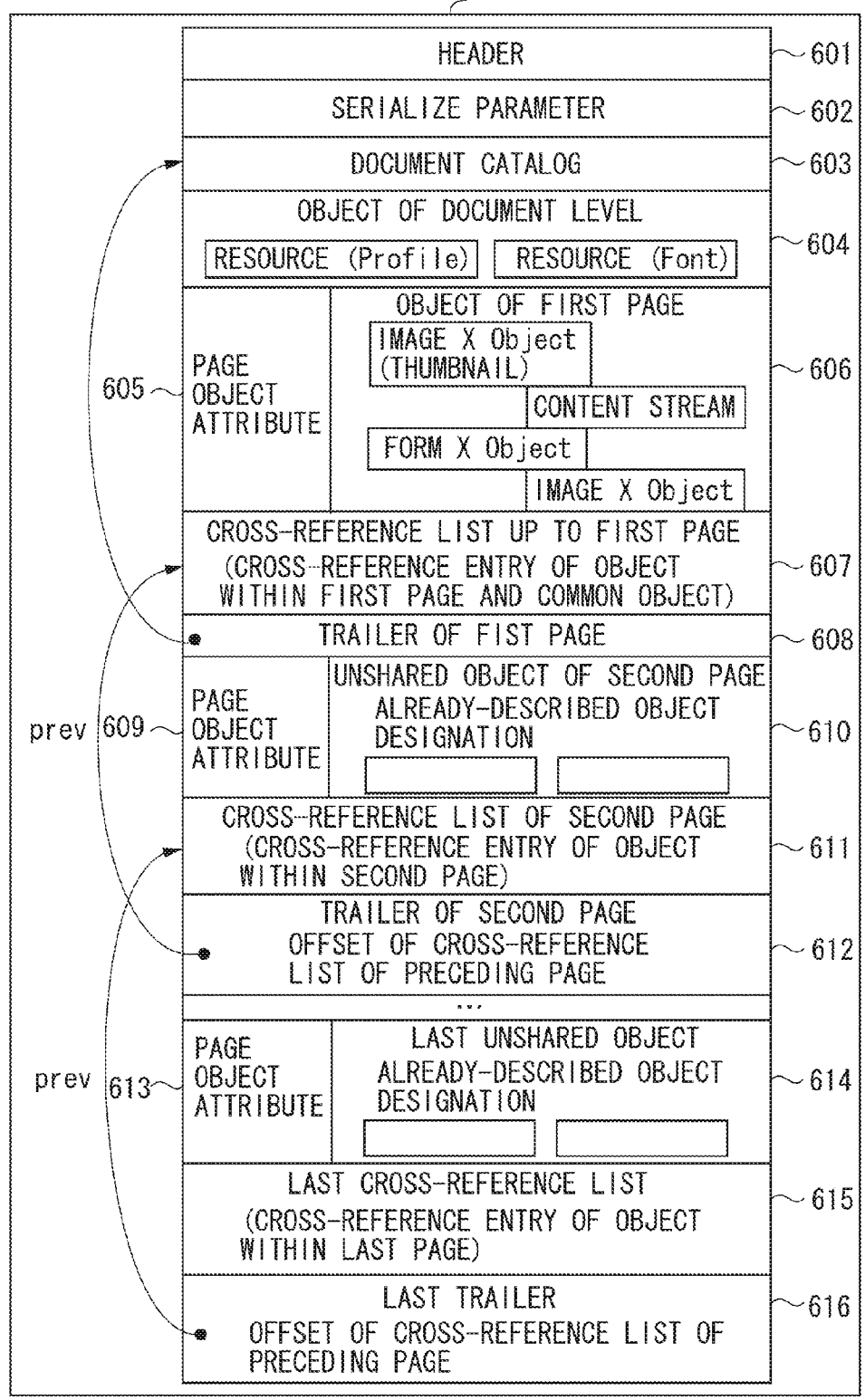
FIG. 6 illustrates an internal data structure of document image data.

FIG. 6 illustrates an internal data structure of the document image data to be processed by the printing apparatus according to the present exemplary embodiment. In the present exemplary embodiment, the rendering objects includes objects with different attributes such as images, graphics, and gradations.

Document image data 600 is internally divided into the following sections 601 to 616. A header 601 indicates a format version of the document image data file. A serialized parameter 602 is a dictionary object indicating that the data file is described in the format that can be sequentially processed from a head of the file, and description is typically given as follows:

43 0 obj
<</Serialized 1.0% serialized format version>>
endobj

A document catalog 603 and a document level object 604 are sections which include resource objects commonly used in the document image data file. For the resource objects, the International Color Consortium profile (ICC) profile dictionary, the Font dictionary, or the like is specified.

A page object 605 is defined as a page object relating to only a head page of the document image data file. A page object 606 is a section in which objects are arranged, and an object relating to the head page defined by the page object 605 is included.

A cross-reference list 607 of the head page indicates positions of all objects included in the page object 606 in byte offsets from the file head. In a trailer 608 of the head page, there are arranged byte offset information indicating the position of the cross-reference list 607 of the head page, address information of the document catalog 603, and the like. Information up to the trailer 608 of the head page, all pieces of information for performing rendering processing on the first page are gathered.

A section 609 and subsequent sections are necessary for performing rendering processing on the second and subsequent pages. Basically, page objects, objects relating to rendering within the page, the cross-reference list, and the trailer are aligned in this order on a page-to-page basis, and this is repeated up to the last page.

Regarding a description method in the second and subsequent pages, a grammar of the incremental update specified in ISO32000-1 is applied. In other words, the sections relating to the head pages from the sections 601 to 608 are taken as "original electronic document file".

Following the section 609, "updated body", "updated cross-reference list", and "updated trailer" are added to the document image data 600 each time the number of pages increases, and this is repeated up to the last page. As described above, the document image data is compliant with ISO 32000-1, regarding the portions other than the serialized parameter 602. Objects are arranged in a section 610, which includes objects relating to the head page defined by the page object 609. The document image data 600 also includes a cross-reference list 611 of the second page, a trailer 612 of the second page. Objects are arranged in a section 614, which includes objects relating to the head page defined by the page object 613. The document image data 600 also includes a cross-reference list 615 of the last page and a trailer 616 of the last page.

An electronic document file processing program compliant with ISO 32000-1 may process the document image data 600 according to the present invention. In that case, since the serialized parameter 602 which cannot be interpreted as a dictionary object will be neglected, the document image data 600 is normally interpreted as an electronic document compliant with ISO 32000-1, and is subjected to rendering processing.

In the present exemplary embodiment, an example in which the CPU 202 changes an optimization level of the document image data 512 as the document image data analysis unit 303 will be described.

Figure 7:
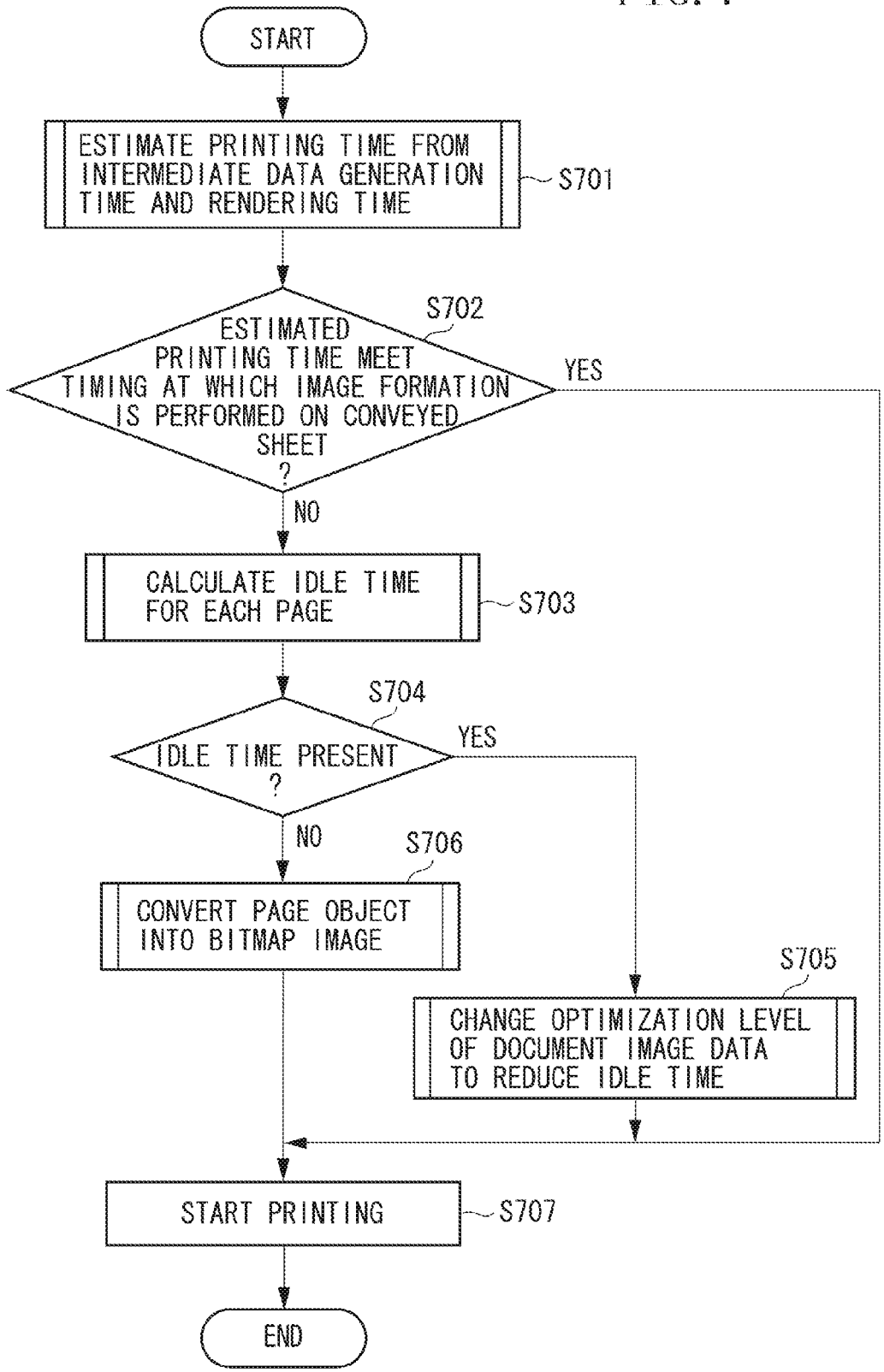
FIG. 7 is a flowchart illustrating a data processing method of the printing apparatus.

FIG. 7 is a flowchart illustrating a data processing method of the printing apparatus according to the present exemplary embodiment. It is assumed that the document image data 512 is stored in the document storage unit 307 in the printer 102 via the network from the external device 101 by the user's operation in the present exemplary embodiment. The processing according to the present exemplary embodiment is described below in which the CPU 202 changes the optimization level with respect to the document image data, before a print request for the document image data 512 is issued from the user. The processing in each step is realized by the CPU 202 loading a control program stored in the HDD 209 or the ROM 205 to the RAM 204 and executing the control program.

First in step S701, the CPU 202 estimates a printing time by adding an intermediate data generation time and a rendering time to determine an optimization level. More specifically, the CPU 202 uses attributes of print data, a type of the printer 102, and performance of the CPU 202 as conditions and refers to a table which stores relationships between combinations of respective conditions and the printing times to estimate the printing time. In this case, the attributes of print data include image data, graphics data, font data and so forth. Further, a table indicating a job time and a printing time of each object is stored in the document storage unit 307 in the printer 102.

Values stored in the table do not need to be fixed values, and the values may be changed by learning, so that estimation with a higher precision can be made. Further, the attributes of print data are clarified by the page object 606 of the document image data 512. The performance of the CPU 202 and the type of the printer 102 are fixed. Elements in the table to be used for calculation of the intermediate data generation time and the rendering time are different. The elements for estimating the rendering time include a type of the renderer to be used in the printer 102, the performance of the CPU 202, and an amount of rendering data.

In the present exemplary embodiment, the scan line renderer 402 is used by the printer 102, however other renderers such as a painters model may be used. In case of the scan line renderer 402, a table for estimating a job time is created based on parameters such as the number of contours and the number of overlaps of the rendering objects in a page as an amount of the rendering data.

A program for estimating the printing time is stored in the HDD 209 or the RAM 204 in the printer 102. While types of the CPU 202 and the renderer are varied according to the printer 102, information of rendering objects common to all models can be used in a time estimation using the document image data 512.

Next, in step S702, the CPU 202 determines whether the printing time estimated in step S701 can keep up with a timing at which image formation needs to be performed on sheets conveyed to respective pages from estimated printing times of the respective pages. In this process, times to be compared are printing times by the job. If the CPU 202 determines that the estimated printing time can keep up with the timing at which image formation needs to be performed on conveyed sheet as a result of comparison (YES in step S702), the processing proceeds to step S707. In step S707, the CPU 202 directly starts printing without changing the optimization level of the document image data 512, and ends the processing.

On the other hand, if the CPU 202 determines that the printing time does not keep up with an engine speed (NO in step S702), then in step S703, the CPU 202 calculates an idle time 805 between the intermediate data generation time and the rendering time. The idle time 805 is described with reference to FIG. 8.

Figure 8:
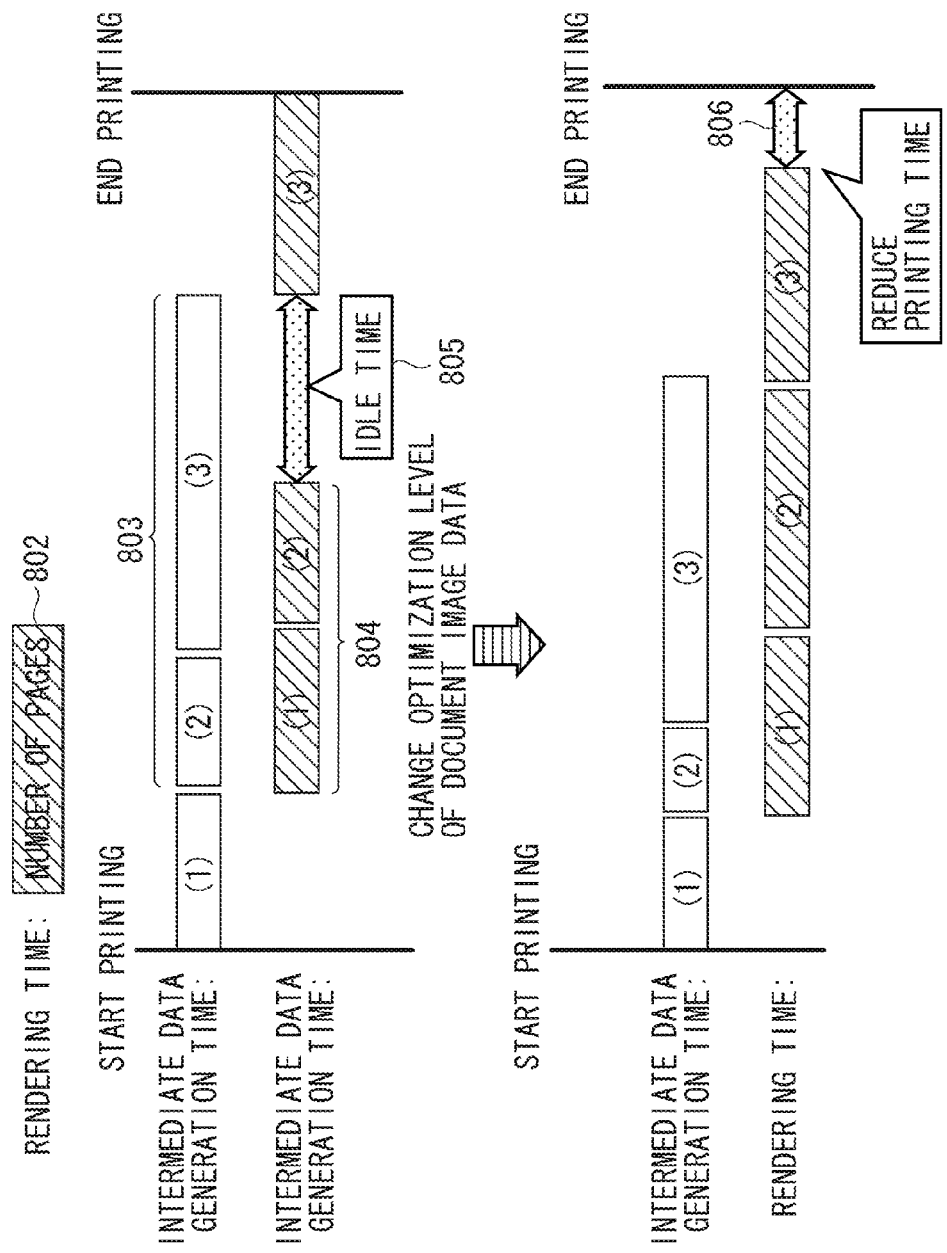
FIG. 8 is a chart illustrating document image data processing time in the printing apparatus.

As illustrated in FIG. 8, in the estimation of the printing time, an intermediate data generation time 801 required for converting into data for printing on the printing apparatus side and a rendering time 802 required for rendering processing are calculated for each page. When these two processing times do not keep up with the engine speed of the printing apparatus, the idle time 805 is generated between the both processing times.

Figure 9:
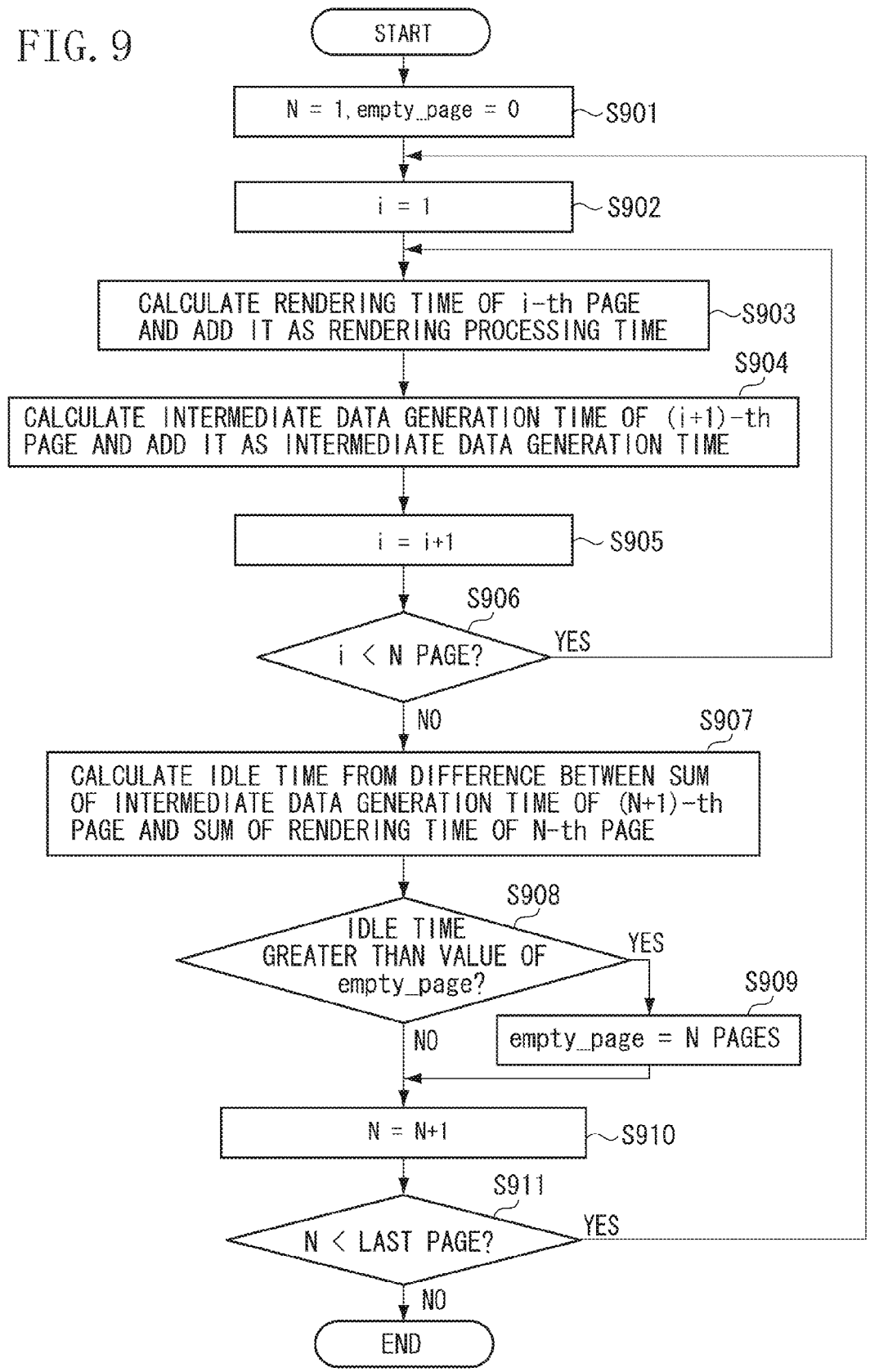
FIG. 9 is a flowchart illustrating a data processing method of the printing apparatus.

FIG. 9 is a flowchart illustrating a data processing method of the printing apparatus according to the present exemplary embodiment. FIG. 9 illustrates an example of a detailed procedure for calculating the idle time 805 illustrated in FIG. 8, more specifically, for calculating the idle time for each page illustrated in step S703. The processing in each step is realized by the CPU 202 loading a control program stored in the HDD 209 or the ROM 205 to the RAM 204 and executing the control program. In this process, the document image data 512 used in processing in FIG. 9 is assumed to include a plurality of pages.

First in step S901, the CPU 202 initializes a variable empty_page which indicates a page including the greatest idle time and a counter N for counting pages for which the idle time is calculated (i.e., variable empty_page=0, counter N=1). Next, in step S902, the CPU 202 sets a variable i for calculating the sum of the intermediate data generation time and the sum of the rendering time of (N+1)-th page to "1".

Then, the CPU 202 repeats the processing from steps S902 to S906, until it is determined that the variable i has been counted to N-th page in step S906. More specifically, in step S903, the CPU 202 calculates a rendering time of i-th page and adds it as the rendering processing time. In step S904, the CPU 202 calculates an intermediate data generation time of (i+1)-th page and adds it as the intermediate data generation processing time. Then, in step S905, the CPU 202 increments the variable i by "1". In step S906, the CPU 202 determines whether the variable i is less than N. If it is determined that the variable i is less than N (YES in step S906), the processing returns to step S903, and the CPU 202 similarly repeats the processing.

On the other hand, if the CPU 202 determined that the variable i is greater than or equal to N (NO in step S906), the processing proceeds to step S907. In step S907, the CPU 202 calculates the idle time from a difference between the intermediate data generation time and the rendering time. Then, in step S908, the CPU 202 determines whether the idle time 805 of N-th page is greater than that of the previous page by comparing the both.

If the CPU 202 determines that the idle time of the N-th page is greater than that of the previous page (YES in step S908), in step S909, the CPU 202 updates a value of the variable empty_page, and the processing proceeds to step S910. This processing is performed in order to calculate a page including the greatest idle time. The idle time means an idle time during which the rendering needs to be paused between pages by comparing the intermediate data generation time and the rendering time.

On the other hand, if the CPU 202 determines that the idle time 805 is less than that of the previous page (NO in step S908), in step S910, the CPU 202 updates a value of the counter N by incrementing it by "1", in order to calculate an idle time of the next page.

Then, in step S911, the CPU 202 determines whether the calculations of the idle times is finished to the last page from whether the counter N is equal to or larger than the last page. If it is determined that the calculations of the idle times is not finished to the last page (YES in step S911), the processing returns to step S902. On the other hand, if it is determined that the calculations of the idle times is finished to the last page (NO in step S911), the processing ends.

Accordingly, there can be extracted a page X in which a difference is greatest when a difference (idle time 805) is generated between the both processing times, when an idle time is calculated for each page.

Returning to descriptions of FIG. 7, in step S704, the CPU 202 determines whether the idle time 805 is present based on the above-described method. In this process, the CPU 202 determines whether the idle time 805 is present, according to whether the value of the variable empty_page used in FIG. 9 is "0". If the CPU 202 determines that the variable empty_page is not greater than "0" (NO in step S704), it indicates that the idle time 805 has been always "0", and the processing proceeds to step S706.

On the other hand, if the CPU 202 determines that the idle time is present (YES in step S704), in step S705, the CPU 202 selects an optimization level which reduces the idle time with respect to the document image data from features of the rendering objects of the extracted page X.

The optimization of the level is aimed at changing rendering contents and improving the processing time by optimizing the rendering method based on tendency of the data with respect to the document image data 512, which is conventionally handled by only a rendering method for one pattern. The levels subjected to the optimization have different contents to be processed depending on the respective levels, and the details thereof will be described below.

Figure 10:
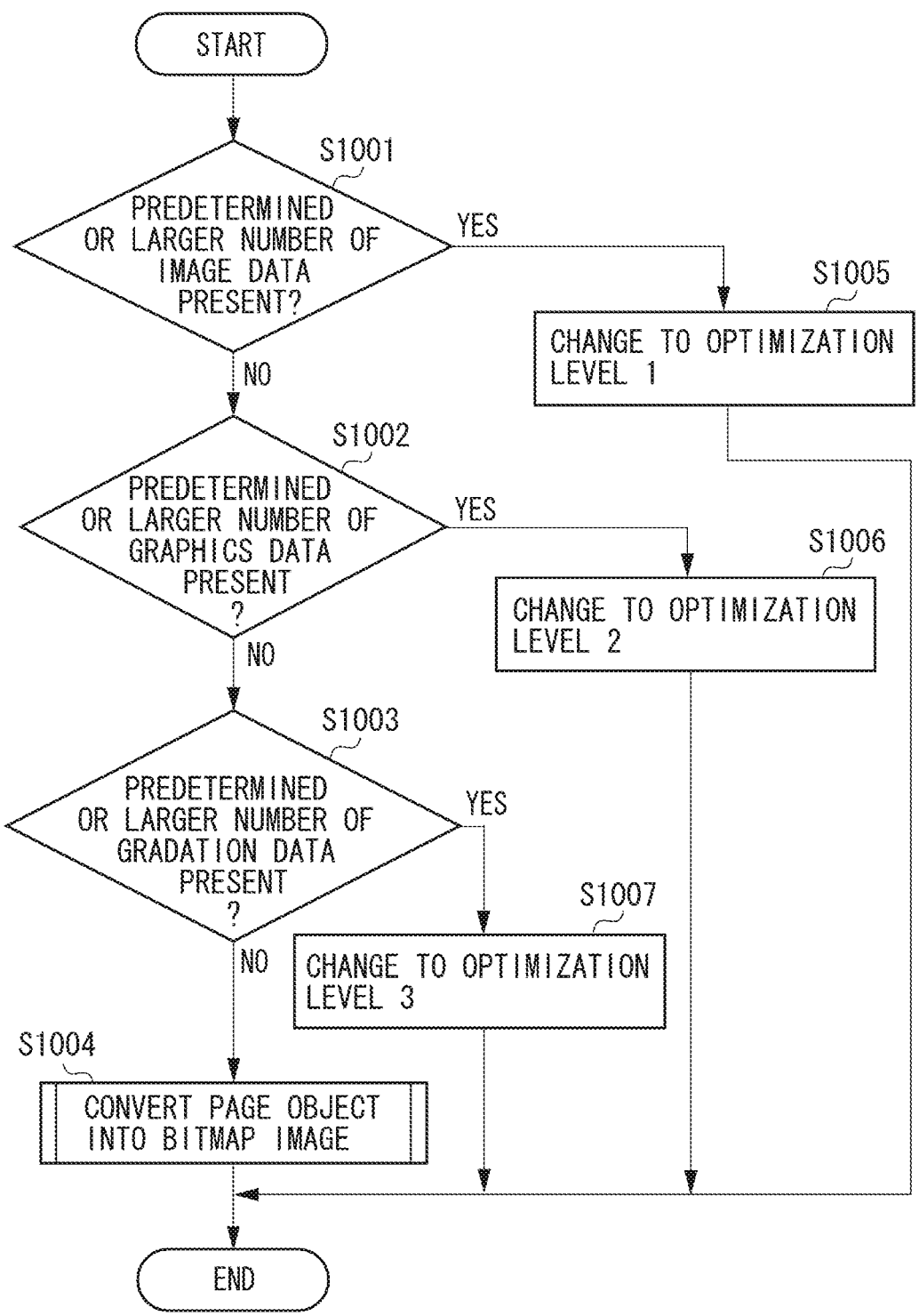
FIG. 10 is a flowchart illustrating a data processing method of the printing apparatus.

FIG. 10 is a flowchart illustrating a data processing method of the printing apparatus according to the present exemplary embodiment. FIG. 10 illustrates an example of a detailed procedure for changing the optimization level in step S705 illustrated in FIG. 7. The processing in each step is realized by the CPU 202 loading a control program stored in the HDD 209 or the ROM 205 to the RAM 204 and executing the control program. The processing for determining data amount for each object attribute included in the document image data and changing a level of optimization which needs to be processed with respect to the document image data to shorten the idle time will be described below.

First, in step S1001, the CPU 202 determines, from the page object 614 of the page X, whether the number of included image data pieces is greater than or equal to a predetermined value to change features of objects and the contents thereof. If the CPU 202 determines that the number of the included image data pieces is greater than or equal to the predetermined value (YES in step S1001), the processing proceeds to step S1005. In step S1005, the CPU 202 changes the optimization level with respect to the document image data to an optimization level 1, and then ends the processing. Accordingly, a load of the processing times of the intermediate data generation time and the rendering time is changed based on the selected optimization level.

If the optimization level is changed to the optimization level 1, the CPU 202 changes a rendering method for images. For example, when the bitmap image of the document image data 512 undergoes rotation processing or enlargement/reduction processing, the CPU 202 selects whether to perform the processing during generation of the intermediate data, or during rendering.

Figure 11:
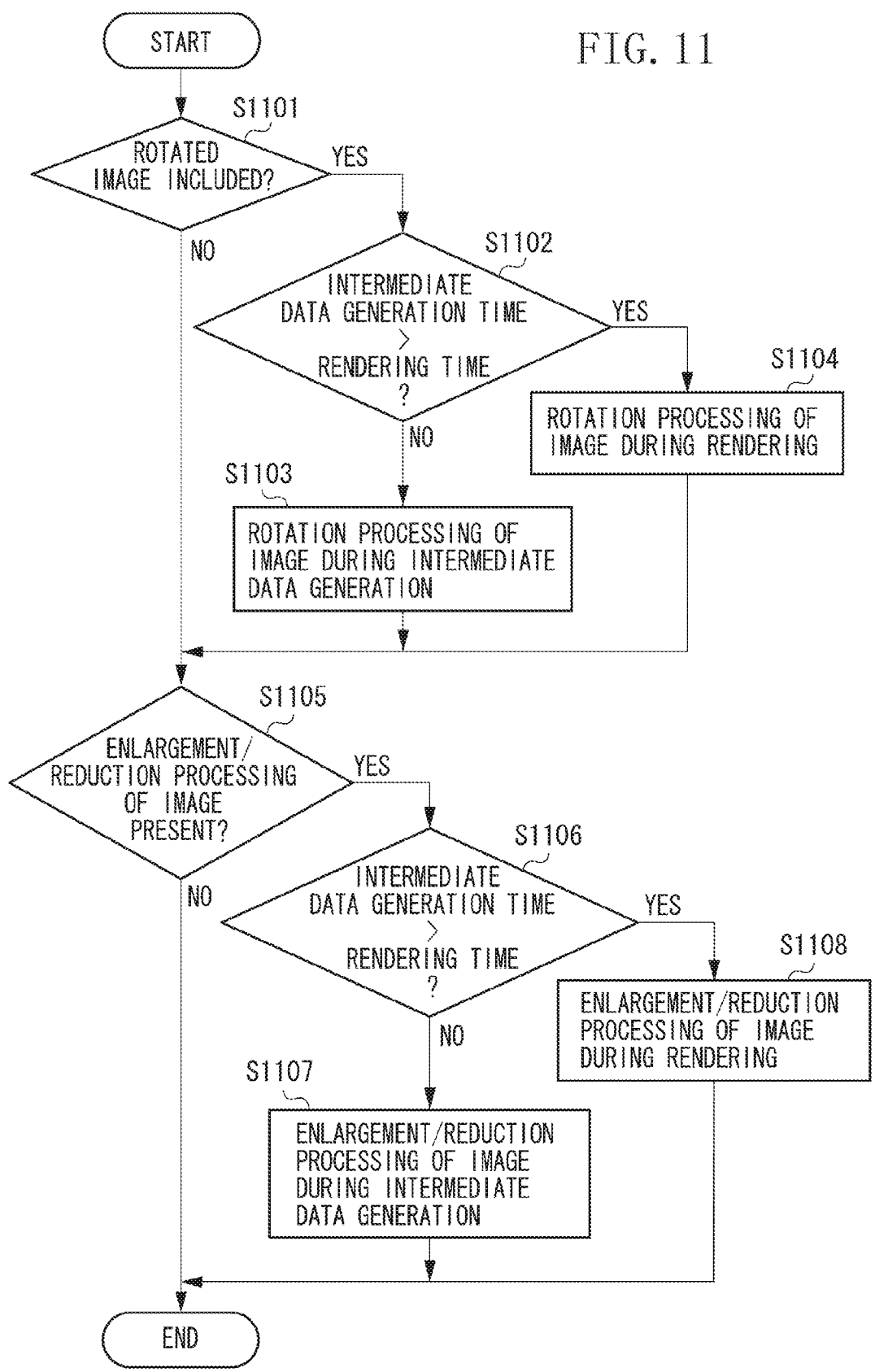
FIG. 11 is a flowchart illustrating a data processing method of the printing apparatus.

FIG. 11 is a flowchart illustrating a data processing method for the printing apparatus according to the present exemplary embodiment. FIG. 11 illustrates an example of a detailed procedure for changing the optimization level 1 in step S1005 illustrated in FIG. 10. The processing in each step is realized by the CPU 202 loading a control program stored in the HDD 209 or the ROM 205 to the RAM 204 and executing the control program. The processing for determining whether to perform processing on a particular object in the document image data during the rendering or during the intermediate data generation is described below. In the present exemplary embodiment, an example of control to execute the particular image processing executable during the intermediate data generation during the rendering is described. In this case, the particular image processing includes the enlargement/reduction processing and the rotation processing.

First in step S1101, the CPU 202 determines whether a rotated image is included in a page in the target document image data. If the CPU 202 determines that the rotated image is included (YES in step S1101), the processing proceeds to step S1102.

In step S1102, the CPU 202 compares processing times of an intermediate data generation time and a rendering time and determines whether the rendering time is shorter. If the CPU 202 determines that processing time of the intermediate data generation time is longer than the rendering time (YES in step S1102), then in step S1104, the CPU 202 changes the processing to generate the rotated image during the rendering, and the processing proceeds to step S1105.

On the other hand, if the CPU 202 compares the processing times of the intermediate data generation time and the rendering time and determines that the rendering time is longer (NO in step S1102), the processing proceeds to step S1103. In step S1103, the CPU 202 changes the processing to perform rotation processing when generating the intermediate data.

Accordingly, a tradeoff between the processing times of the intermediate data generation time and the rendering time is changed, and the sum of these two processing times can be changed.

Next, the CPU 202 determines whether the enlargement/reduction processing of image is present. If the CPU 202 determines that the enlargement/reduction processing of image is present (YES in step S1105), then in step S1106, the CPU 202 determines whether the rendering time is shorter by comparing the processing times of the intermediate data generation time and the rendering time. If it is determined that the processing time of the intermediate data generation time is longer than the rendering time (YES in step S1106), in step S1108, the CPU 202 changes the processing to generate an enlarged/reduced image during the rendering, and ends the processing.

On the other hand, if it is determined that the processing time of the intermediate data generation time is shorter than the rendering time (NO in step S1106), in step S1107, the CPU 202 changes the processing to generate an enlarged/reduced image during the intermediate data generation, and ends the processing.

On the other hand, if the CPU 202 determines that enlargement/reduction processing of image is not present (NO in step S1105), the CPU 202 ends the processing.

The processing in step S1002 and subsequent steps illustrated in FIG. 10 will be described.

In step S1001, if the CPU 202 determines that the number of included image data pieces is not greater than or equal to the predetermined value (NO in step S1001), then in step S1002, the CPU 202 determines whether a predetermined or lager number of graphics data pieces are present in the page X.

If the CPU 202 determines that the predetermined or larger number of graphics data pieces are present in the page X (YES in step S1002), in step S1006, the CPU 202 changes the optimization level with respect to the document image data 512 to an optimization level 2, and ends the processing.

In the optimization level 2, the rendering order of objects is changed with respect to a large amount of graphics data pieces. This is because, if there is a plurality of objects with the same color which are overwritten at the same position, overlapping objects are reduced by changing the order of the objects to be rendered. Accordingly, the time and effort to create a plurality of renderings of the same objects during the intermediate data generation can be saved.

On the other hand, if the CPU 202 determines that the predetermined or larger number of graphics data pieces are not present in the page X (NO in step S1002), in step S1003, the CPU 202 determines whether a predetermined or larger number of gradation data pieces are present in the page X.

If the CPU 202 determines that the predetermined or larger number of gradation data pieces are present in the page X (YES in step S1003), the processing proceeds to step S1007. In step S1007, the CPU 202 changes the optimization level with respect to the document image data 512 to an optimization level 3, and ends the processing.

Regarding the optimization level 3, the CPU 202 selects whether a rendering method for the gradation data is composed of a plurality of image renderings or is replaced by one gradation rendering. In the gradation rendering composed of a plurality of images, a load of the processing is changed during the intermediate data generation or during the rendering. The change of the optimization level has an effect of making a correction so that a difference between the intermediate data generation time and the rendering time is lessened, as a condition for the idle time not to be generated.

In the above-described exemplary embodiment, it is described a method for detecting a page including the greatest idle time 805 so that a printing time of the document image data 512 is improved. However, change of the optimization level may be performed not only on a job basis but also on a page basis. Alternatively, a method for estimating printing times of the document image data 512 when respective optimization levels are reflected, and selecting an optimization level at which the processing time is the shortest by comparing the printing times of the respective jobs may be employed. Accordingly, a method for changing an optimization level is not necessary to stick to a method for determining an idle time for each page as described in the present exemplary embodiment. As long as an optimization level of the document image data 512 can be changed, any method for aiming at shortening of the printing time can be employed.

Accordingly, the CPU 202 determines the optimization level based on a result of the printing times estimated from the document image data 512. Then, the CPU 202 executes processing for reworking a configuration of the document image data 512 to change a rendering method for page objects, to match the optimization level of the document image data 512.

On the other hand, if it is determined that the predetermined or larger number of gradation data pieces are not present in the extracted page X (NO in step S1003), the processing proceeds to step S1004. In step S1004, the CPU 202 executes processing for converting a portion of the page objects into bitmap images, and ends the processing.

Descriptions will be given of detailed processing in step S706, when an estimated printing time cannot keep up with the engine speed of the printer 102 and the idle time is not present, and in step S1004, when the idle time 805 is present but an optimization level does not fall under any of the optimization level 1 to the optimization level 3.

This is a pattern which is the least wanted to be executed among the patterns anticipated when the document image data 512 is optimized. In this case, the plurality of page objects 606 in the document image data 512 is converted into bitmap images in advance. The processing of the pattern will be described below according to FIG. 3.

In this pattern, data to be printed needs to be rendered in advance in order to make the printing time to keep up with the printer's engine speed. Thus, the document image data analysis unit 303 transmits a plurality of objects to the data rendering unit 304 from the page object 606.

Then, the bitmap image created by the data rendering unit 304 is stored in the document storage unit 307. In this process, when the bitmap data is generated in advance, it is necessary to pay attention not to generate a region which exceeds a storage capacity of the document storage unit 307. By making the document rendering data store rendering results in advance, the intermediate data generation and the rendering which can keep up with the printer's engine speed can be achieved.

Finally, the effects of the present exemplary embodiment based on a general document will be described with reference to FIG. 8. In the example illustrated in FIG. 8, it is assumed that print data includes a total of three pages. In step S701, the CPU 202 acquires an intermediate data generation time and a rendering time as illustrated in FIG. 8 in the processing for estimating a printing time. Then, in step S703, the CPU 202 calculates the idle time 805 of a rendering time 804 added with a rendering time of the second page and an intermediate data generation time 803 from the second page to the third page.

In step S907, the CPU 202 calculates the idle times 805 of all pages, and determines that a page including the greatest difference is the second page which is due to the rendering time. Next, in step S705, the CPU 202, since the idle time 805 is present, advances to the processing for setting an optimization level of the document image data 512.

When the optimization level is verified, in step S1001, the CPU 202 determines whether image data present in the document image data 512 of the second page is greater than or equal to a threshold value. In this process, in each page of the document image data, the CPU 202 changes a generation method for images by comparison between the intermediate data generation time 801 and the rendering time 802 based on the optimization of the optimization level 1 (FIG. 11). In this case, in step S1104 and step S1108, since the intermediate data generation time 803 is later than the rendering time 804, the CPU 202 disperses the load of the image processing during the rendering.

Accordingly, as a result that the CPU 202 estimates again a printing time after the optimization in step S701, the idle time 805 estimated at previous time is eliminated and the printing time can be reduced (time 806). According to above-described correction of the printing time, the printing time can be speeded up than the conventional case, by reflecting the optimization level which makes up for the idle time on the document image data 512.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-107010 filed May 12, 2011, which is hereby incorporated by reference herein in its entirety.

What is claimed is:

1. A printing apparatus that forms an image generated by analyzing document image data including a plurality of pages on a conveyed sheet, the printing apparatus comprising:
    an estimation unit configured to analyze document image data of each page and estimate a printing time of each page by adding an intermediate data generation time for generating intermediate data and a rendering time for rendering the generated intermediate data;
    a determination unit configured to determine whether the printing time of each page estimated by the estimation unit keeps up with a timing at which an image needs to be formed on a sheet conveyed for each page;
    a discrimination unit configured to, if it is determined that the printing time does not keep up with the timing at which the image needs to be formed, determine whether an idle time for pausing rendering between pages is present by comparing the intermediate data generation time and the rendering time; and
    a changing unit configured to, if it is determined that the idle time is present, change an optimization level for determining whether to perform processing on a particular object in the document image data during rendering or to perform the processing during intermediate data generation.

2. The printing apparatus according to claim 1, wherein the optimization level is determined based on whether a predetermined, or greater, number of image data, graphics data, and gradation data are included in the document image data.

3. The printing apparatus according to claim 1, further comprising a control unit configured to control whether to perform processing on the particular object in the document image data during rendering or to perform the processing during intermediate data generation according to a level of optimization to be changed by the changing unit.

4. The printing apparatus according to claim 1, further comprising a conversion unit configured, if it is determined by the discrimination unit that the idle time is not present, to convert a part of an object included in the document image data into a bitmap image.

5. A method for processing data in a printing apparatus that forms an image generated by analyzing document image data including a plurality of pages on a conveyed sheet, the method comprising:
    analyzing document image data of each page and estimating a printing time of each page by adding an intermediate data generation time for generating intermediate data and a rendering time for rendering the generated intermediate data; and
    determining whether the estimated printing time of each page keeps up with a timing at which an image needs to be formed on a sheet conveyed for each page,
    wherein if it is determined that the printing time does not keep up with the timing at which the image needs to be formed, further determining whether an idle time for pausing rendering between pages is present by comparing the intermediate data generation time and the rendering time, and
    wherein if it is determined that the idle time is present, changing an optimization level for determining whether to perform processing on a particular object in the document image data during rendering or to perform the processing during intermediate data generation.

6. The method for processing data in a printing apparatus according to claim 5, wherein the optimization level is determined based on whether a predetermined, or greater, number of image data, graphics data, and gradation data are included in the document image data.

7. The method for processing data in a printing apparatus according to claim 5, further comprising controlling whether to perform processing on the particular object in the document image data during rendering or to perform the processing during intermediate data generation according to a level of optimization to be changed.

8. The method for processing data in a printing apparatus according to claim 5, further comprising, if it is determined by the discrimination unit that the idle time is not present, converting a part of an object included in the document image data into a bitmap image.

9. A non-transitory computer readable storage medium storing a program for causing a computer to execute a method according to claim 5.

* * * * *